US008896863B2

(12) United States Patent
Hu et al.

(10) Patent No.: US 8,896,863 B2
(45) Date of Patent: Nov. 25, 2014

(54) SYSTEM AND METHOD OF MODELING CUSTOMER DEMAND IN A PRINT PRODUCTION ENVIRONMENT

(75) Inventors: Bo Hu, Pittsford, NY (US); Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 977 days.

(21) Appl. No.: 13/012,155

(22) Filed: Jan. 24, 2011

(65) Prior Publication Data
US 2012/0188591 A1    Jul. 26, 2012

(51) Int. Cl.
G06F 3/12    (2006.01)
G06Q 30/02  (2012.01)

(52) U.S. Cl.
CPC .......... *G06Q 30/0202* (2013.01); *G06F 3/1203* (2013.01); *G06F 3/1282* (2013.01); *G06F 3/1273* (2013.01)
USPC ....................................................... 358/1.15

(58) Field of Classification Search
None
See application file for complete search history.

(56) References Cited

U.S. PATENT DOCUMENTS

| | | | |
|---|---|---|---|
| 6,611,726 B1 | 8/2003 | Crosswhite | |
| 7,002,702 B1 | 2/2006 | Machida | |
| 7,242,302 B2 | 7/2007 | Rai et al. | |
| 7,562,062 B2 | 7/2009 | Ladde et al. | |
| 7,584,116 B2 | 9/2009 | Kakouros et al. | |
| 7,797,189 B2 | 9/2010 | Rai et al. | |
| 2003/0090708 A1* | 5/2003 | Dennison et al. ............ 358/1.15 |
| 2004/0130745 A1 | 7/2004 | Fabel et al. | |
| 2004/0267485 A1 | 12/2004 | Penov et al. | |
| 2004/0267868 A1* | 12/2004 | Wilk .............................. 709/200 |
| 2007/0070379 A1 | 3/2007 | Rai et al. | |
| 2007/0078585 A1 | 4/2007 | Pomeroy et al. | |
| 2007/0091355 A1 | 4/2007 | Rai | |
| 2007/0092323 A1 | 4/2007 | Lin et al. | |
| 2007/0124182 A1 | 5/2007 | Rai | |
| 2007/0177191 A1 | 8/2007 | Eschbach et al. | |
| 2007/0236724 A1 | 10/2007 | Rai et al. | |
| 2007/0247657 A1 | 10/2007 | Zhang et al. | |
| 2007/0247659 A1 | 10/2007 | Zhang et al. | |
| 2007/0279675 A1 | 12/2007 | Quach et al. | |
| 2007/0293981 A1 | 12/2007 | Rai | |
| 2008/0285067 A1 | 11/2008 | Rai | |
| 2008/0285075 A1 | 11/2008 | Yamanakajima | |
| 2009/0021774 A1 | 1/2009 | Rai | |
| 2009/0021775 A1 | 1/2009 | Rai | |
| 2012/0154850 A1* | 6/2012 | Zhao et al. ................... 358/1.15 |

OTHER PUBLICATIONS

Mestha et al., "Control Elements in Production Printing and Publishing Systems: DocuColoriGen3", Conference on Decision and Control , Dec. 2003, Proceedings of the 42nd IEEE.
Potts et al., "Scheduling with batching: A review", European Journal of Operational Research 120 (2000) 228-249.

(Continued)

*Primary Examiner* — Marivelisse Santiago Cordero
*Assistant Examiner* — Mesfin Getaneh
(74) *Attorney, Agent, or Firm* — Fox Rothschild LLP

(57) ABSTRACT

A method of determining one or more performance metrics associated with a print shop may include identifying one or more historical print jobs from a historical print job database. Each historical print job may include a historical print job type and historical job content information. The method may include generating, by a computing device, one or more synthetic print jobs based on the historical job type and historical job content information associated with the identified historical print jobs, and determining, by the computing device, one or more performance metrics associated with processing the one or more synthetic print jobs by a print shop.

19 Claims, 3 Drawing Sheets

(56) References Cited

OTHER PUBLICATIONS

Crovella et al., "Task Assignment in a Distributed System: Improving Performance by Unbalancing Load", ACM SIGMETRICS Performance Evaluation Review, vol. 26, No. 1, ACM, 1998.

Schroeder et al., "Evaluation of Task Assignment Policies for Supercomputing Servers: The Case for Load Unbalancing and Fairness", Cluster Computer 7.2 (2004): 151-161.

* cited by examiner

SYSTEM AND METHOD OF MODELING CUSTOMER DEMAND IN A PRINT PRODUCTION ENVIRONMENT

BACKGROUND

Accurate customer demand data is important to print shop design, projection of operational costs for a print shop, determining contract pricing and performing customer account management. Typically, historical demand data is collected by examining print jobs that have been processed over an extended period of time. This process is costly and inefficient. The demand pattern often exhibits seasonality, and demand data must be collected over a long period of time to characterize such variability. As such, there is often a significant lead time before historical demand data can be utilized.

In addition, historical demand data may not accurately represent a future demand pattern, especially in a highly dynamic market where demand constantly fluctuates with pricing, competition, economic conditions and/or the like. To adjust for changes to future market conditions, the collected historical demand data is typically scaled up or down using ad hoc methods. As such, little consideration is given to the preservation of characteristics of historical demand patterns in the collected historical demand data. This process often results in inaccurate projections of future demand, which leads to inefficient print job designs, incorrect estimation of operational costs and failure to provide meaningful insights regarding contract pricing and customer account management.

The commonly used ARENA simulation tool can generate voluminous demand data from historical records. However, it models job quantities by drawing randomly from the historical distribution which allows no adjustments to be made for market outlook. Furthermore, customer demand in the printing service industry is structurally complex, and print shop operations are highly dependent on job arrival rates and quantities, as well as job type mix and job content. ARENA does not consider job type mix or job content, and therefore cannot model such properties. In addition, ARENA models customer demand based on a nominal number of hours, such as 24 hours per day, rather than a number of operating hours. This analysis skews the job arrival process and yields unrealistic demand projections where print shops rarely operate continuously throughout a day. As such, simulation tools such as ARENA are unable to accommodate discontinuous operating hours, model complex structure of customer demand or adjust projections to market outlook.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In an embodiment, a method of determining one or more performance metrics associated with a print shop may include identifying one or more historical print jobs from a historical print job database. Each historical print job may include a historical print job type and historical job content information. The method may include generating, by a computing device, one or more synthetic print jobs based on the historical job type and historical job content information associated with the identified historical print jobs, and determining, by the computing device, one or more performance metrics associated with processing the one or more synthetic print jobs by a print shop.

In an embodiment, a method of determining one or more performance metrics associated with a print shop may include identifying one or more historical print jobs from a historical print job database. Each historical print job may include a historical print job type and historical job content information. The method may include creating a modified set of historical print jobs by modifying at least one of the one or more historical print jobs in the historical print job database to reflect one or more of a market condition and a change in a parameter associated with one or more of the historical print jobs. The method may include generating, by a computing device, one or more synthetic print jobs based on the modified set of historical print jobs and performing a robustness test of a print shop to determine one or more performance metrics associated with processing the generated synthetic print jobs by the print shop.

In an embodiment, a system for determining one or more performance metrics associated with a print shop may include a computing device and a computer-readable storage medium in communication with the computing device. The computer-readable storage medium may include one or more programming instructions for identifying one or more historical print jobs from a historical print job database. Each historical print job may include a historical print job type and historical job content information. The computer-readable storage medium may include one or more programming instructions for generating one or more synthetic print jobs based on the historical job type and historical job content information associated with the identified historical print jobs, and determining, by the computing device, one or more performance metrics associated with processing the one or more synthetic print jobs by a print shop.

DETAILED DESCRIPTION

The following terms shall have, for purposes of this application, the respective meanings set forth below:

A "print device" refers to a device capable of performing one or more functions, operations and/or services on a print job. For example, a print device may provide print-related services for one or more print jobs. A print device may include a printer, a cutter, a collator, a scanner, a fax machine, a multi-function device or other similar equipment.

A "job" refers to a logical unit of work that is to be completed for a customer. In a print environment, a job may include one or more print jobs from one or more clients.

A "print job" refers to a job that can be processed by a print production system. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "print shop" refers to an entity that includes a plurality of print devices, such as printers, cutters, collators and the like. A print shop may be a freestanding entity, including one or more print devices, or it may be part of a corporation or other entity. Additionally, a print shop may communicate with one or more servers by way of a communications network, such as the Internet, an intranet, a LAN, a WAN, a wireless network and/or the like.

A "historical print job" is a print job that has been previously processed by a print shop, a theoretical print job that may be processed by a print shop, a benchmark print job processed by a print shop and/or the like.

A "print job function" is an operation, such as printing, binding, collating and/or the like, that is performed on a print job.

"Processing" of a print job means performing one or more print job functions on a print job to transform a print job in some manner and/or result in the display, transmission or conversion of the print job to a physical substrate.

"Operating hours" means a period of time during which a print shop is operational.

A "synthetic print job" is a print job whose content and/or characteristics are extrapolated from one or more actual and/or modified historical print jobs.

"Synthetic print job information" refers to characteristics associated with one or more synthetic print jobs.

Figure 1:
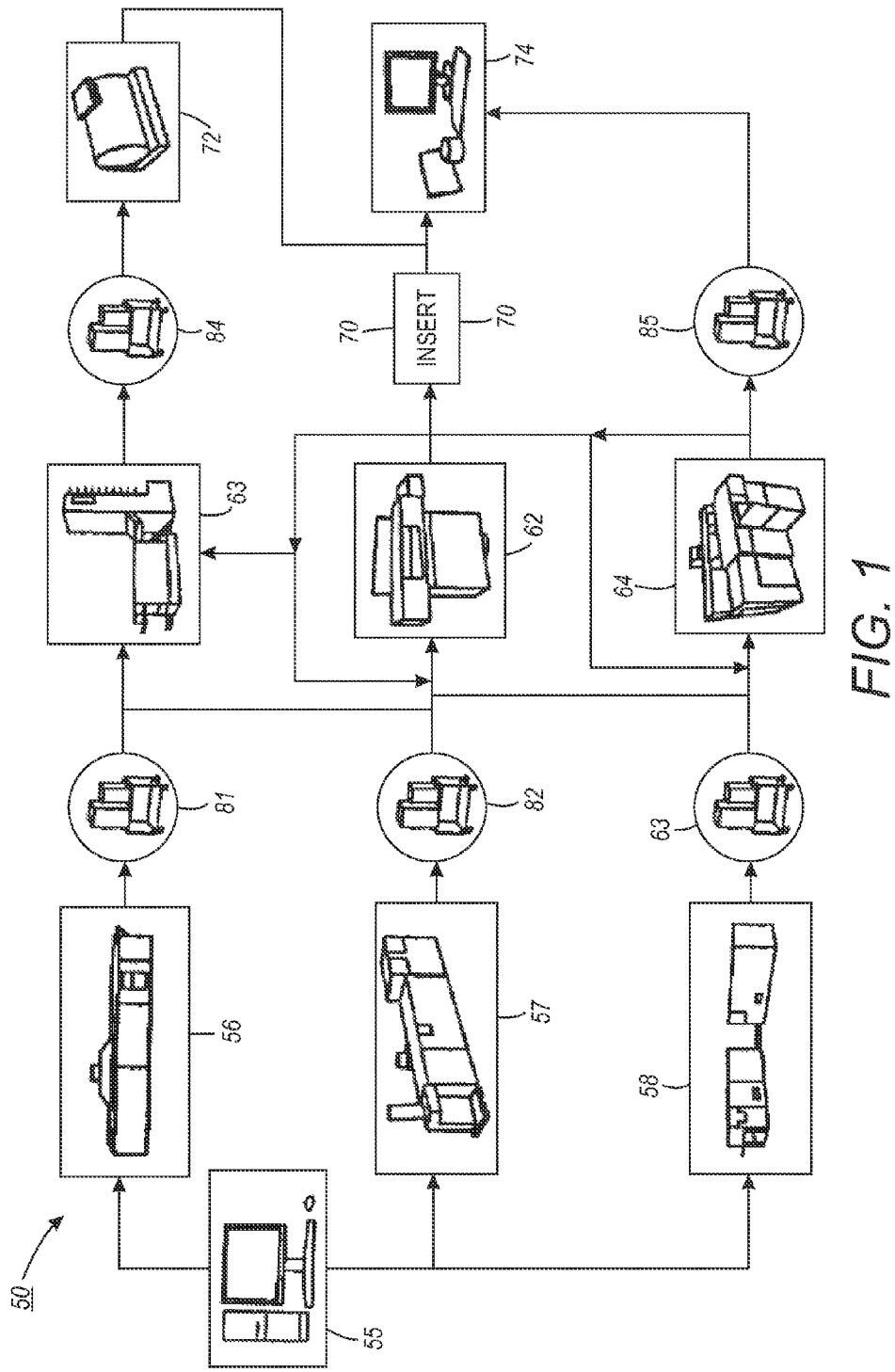
FIG. 1 illustrates an exemplary print shop according to an embodiment.

A "performance metric" is a measure of a print shop's operation. Examples of performance metrics include workspan, turnaround time, print device utilization, energy consumption, number of late print jobs and/or the like FIG. 1 shows an example of a production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 63, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85. Although the disclosed embodiments pertain to document production systems, the disclosed methods and systems can be applied to production systems in general.

Figure 2:
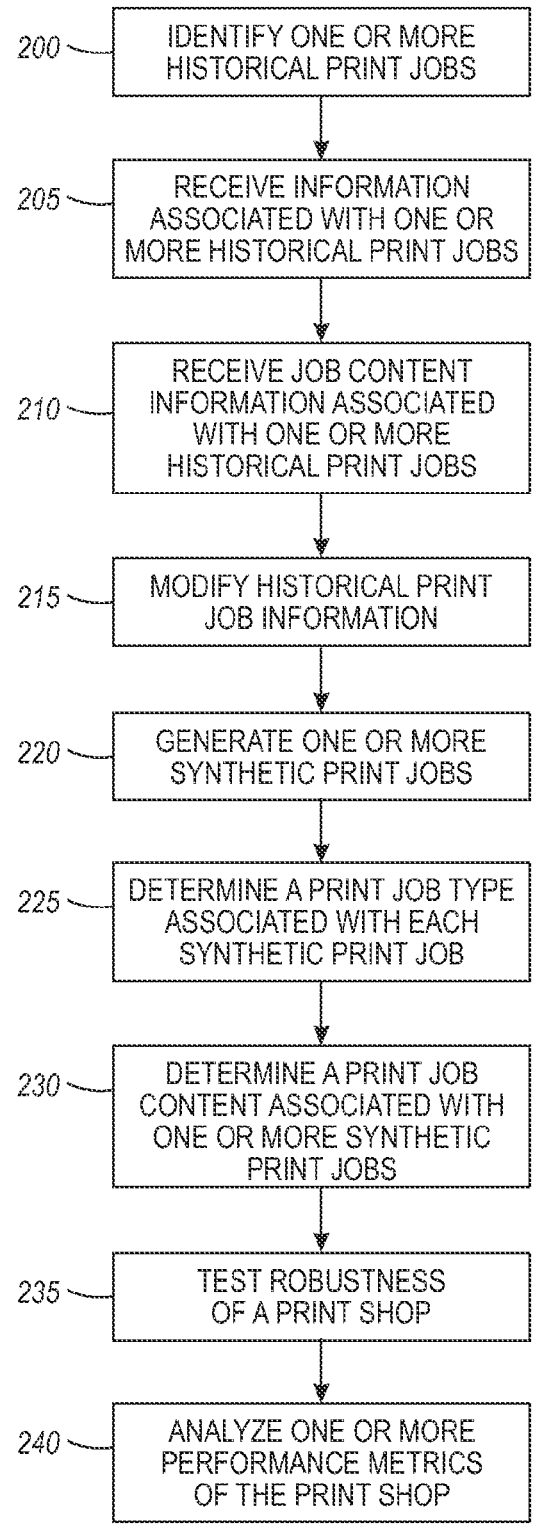
FIG. 2 illustrates an exemplary method of generating synthetic print job data according to an embodiment.

FIG. 2 illustrates an exemplary method of generating synthetic print job data according to an embodiment. Generation of synthetic print job data may reduce costs associated with data collection and lead time. Voluminous synthetic print job data that preserves the characteristics of a historical data set of a limited size may be generated, while seasonality and other market condition changes may be accounted for during the modeling process.

As illustrated by FIG. 2, one or more historical print jobs may be identified 200. In an embodiment, one or more historical print jobs may be identified 200 based on information received from one or more databases, print devices and/or the like. In an embodiment, one or more historical print jobs that are processed over a time period may be identified 200. For example, one or more historical print jobs that are processed over a one week period, a one month period and/or the like may be identified 200. It is understood that additional and/or alternate time periods may be used within the scope of this disclosure.

In an embodiment, an arrival rate may be a frequency with which a print shop receives one or more print jobs over a period of time. In an embodiment, an arrival rate may be an average frequency with which a print shop receives one or more print jobs over a period of time. For example, an arrival rate associated with a print shop may 10 jobs per hour, meaning that, on average, the print shop receives ten print jobs within an hour.

In an embodiment, information associated with one or more identified historical print jobs may be received 205. In an embodiment, information associated with one or more identified historical print jobs may be received from one or more databases, computing devices, print devices and/or the like. For example, in an embodiment, a print job type associated with a historical print job may be received 205. A print job type may be a combination of print job functions that are performed to complete a print job. For example, a print job type "book" may be a combination of print job functions for printing, folding, binding and/or the like. In an embodiment, the print job type associated with each historical print job may be stored in a historical print job database. A historical print job database may be a database and/or other storage medium where information corresponding to one or more historical print jobs is stored.

In an embodiment, job content information associated with one or more historical print jobs may be received 210. Job content information may be received 210 from one or more databases, computing devices, print devices and/or the like. Job content information may include one or more parameters of a historical print job. A parameter may be a characteristic of a historical print job, such as a duration of the historical print job, a quantity associated with the historical print job, print job functions associated with the historical print job, a quantity associated with one or more of the print job functions and/or the like.

A duration of a historical print job may be a number of operating hours of a print shop between the time the print job arrives at the print shop and the time the print job is required to be completed. In an embodiment, a duration may be a time period negotiated by a print shop and customer in which a print job is to be completed. In an embodiment, if the print job is not completed in the duration, the print shop may be charged a fine or incur another penalty.

Table 1 below illustrates job content information of an exemplary 50 page magazine historical print job according to an embodiment.

TABLE 1

| Duration | Print job quantity | Functions | Function quantity |
|---|---|---|---|
| 3 hours | 1,000 magazines | Printing | 50,000 pages |
| | | Binding | 50,000 pages |
| | | Laminating | 25,000 pages |

As illustrated by Table 1, a 50 page magazine historical print job may take three operational hours of a print shop to complete a quantity of 1,000 magazines. The print functions associated with the magazine may be printing, binding and laminating. 50,000 pages may be printed and bound, and 25,000 pages may be laminated.

In an embodiment, job content information may be associated with a job type, and may be stored in the historical print job database. As such, a historical print job database may include, for each identified historical print job, a corresponding print job type and job content information. Table 2 illustrates an exemplary historical print job database that includes information associated with ten identified historical print jobs according to an embodiment.

TABLE 2

| Historical Print Job | Print Job Type | Duration (hours) | Print job quantity | Functions | Function quantity (pages) |
|---|---|---|---|---|---|
| 1 | Book | 4 | 100 | Printing | 10,000 |
| | | | | Folding | 5,000 |
| | | | | Binding | 10,000 |
| 2 | Book | 2.5 | 50 | Printing | 15,000 |
| | | | | Folding | 7,500 |
| | | | | Binding | 15,000 |
| 3 | Book | 8 | 2,000 | Printing | 400,000 |
| | | | | Folding | 200,000 |
| | | | | Binding | 400,000 |
| 4 | Book | 5 | 400 | Printing | 200,000 |
| | | | | Folding | 100,000 |
| | | | | Binding | 200,000 |
| 5 | Book | 2 | 110 | Printing | 10,000 |
| | | | | Folding | 5,000 |
| | | | | Binding | 10,000 |
| 6 | Envelope | 1 | 1,000 | Printing | 1,000 |
| 7 | Envelope | 2 | 750 | Printing | 750 |
| 8 | Envelope | 1 | 850 | Printing | 850 |
| 9 | Magazine | 3 | 1,000 | Printing | 50,000 |
| | | | | Folding | 50,000 |
| | | | | Binding | 50,000 |
| | | | | Laminating | 50,000 |
| 10 | Manuscript | 4 | 200 | Printing | 6,000 |
| | | | | Folding | 6,000 |
| | | | | Binding | 6,000 |

In an embodiment, information in a historical print job database may be modified 215 to create a modified set of historical print jobs. In an embodiment, modified historical print jobs may be analyzed so synthetically generated print jobs reflect anticipated market conditions and/or other changes. For example, market research may indicate that the arrival rate of print jobs will increase by 10%. In an embodiment, if the original arrival rate is denoted by $\lambda_0$, in forecast, the new arrival rate may be denoted by $\lambda_0(1+10\%)$. Assuming that print jobs arrive according to a revised Poisson process, the probability that k jobs arrive within time period t may be determined by:

$$P\{N(t) = k\} = e^{-\lambda \xi} \frac{(\lambda \xi)^k}{k!}$$

where $\xi$ is the cumulative operation time units at time t.

In an embodiment, the arrival rate of synthetic print jobs may follow a revised Poisson process having an arrival rate of $\lambda$. For example, referring to the above example, the determined cumulative number of print jobs may reflect the anticipated 10% increase. In an embodiment, a revised Poisson process may have a mean of $\lambda \xi$. In contrast to a standard Poisson process which is a function of continuous time, a revised Poisson process may be a function of a set of discrete time periods spanning across the operating hours of a print shop.

In an embodiment, information in a historical print job database may be modified 215 to include new print job types. For example, a historical print job database may only include information relating to Book and Magazine print job types. The information in the print job database may be modified 215 to include information relating to an Envelope or other print job type. In an embodiment, information in a historical print job database may be modified 215 to remove one or more print job types from the database. For example, if a customer no longer processes magazines, historical print jobs with a Magazine print job type may be removed from the historical print job database.

In an embodiment, information in a historical print job database may be modified 215 to increase or decrease the frequency of one or more types of historical print jobs. For example, a customer may expect the frequency with which the customer processes a certain print job type to increase. For instance, a customer may anticipate that it will process 20% more books in the upcoming months. The information in a historical print job database may be modified to add 20% more historical print jobs having "Book" print job type.

In an embodiment, information in a historical print job database may be modified 215 to change the print job content associated with one or more print job types of one or more historical print jobs. In an embodiment, print job content may be revised, added, deleted and/or the like. For example, in an embodiment, information in a historical print job database may be modified 215 to increase or decrease a job arrival rate associated with one or more historical print jobs in the database.

In an embodiment, modified print job data may be used to model future demand distributions. For example, modified print job data may be used to model future demand distributions to predict future operational costs, which may be important for resource planning and contract pricing. Because the efficiency of print shop operations may be sensitive to demand volume, demand types and job arrival patterns, it is unlikely that future operational costs of a print shop can be successfully predicted based solely on historical data. As a result, misinformed sales personnel may propose a printing service contract that is initially profitable, but turns to a loss once market conditions change.

In an embodiment, a historical print job database may be used to generate 220 one or more synthetic print jobs. In an embodiment, a timeline of synthetic print job arrivals may be generated. In an embodiment, it may be assumed that the arrival of synthetic print jobs follows a revised Poisson process with a rate of $\lambda$. In an embodiment, a cumulative number of synthetic print jobs arriving at time t, N(t), may have a Poisson process with a mean of $\lambda \xi$, such that:

$$P\{N(t) = k\} = e^{-\lambda \xi} \frac{(\lambda \xi)^k}{k!},$$

where $\xi$ is the cumulative number of operating hour time units at time t.

In an embodiment, the revised Poisson process may be a function of a set of discrete time periods spanning across the operating hours of a print shop.

In an embodiment, a print job type associated with each synthetic print job may be determined 225. In an embodiment, each print job type in a historical print job database may have a corresponding frequency value. A frequency value may represent a measurement of how often a certain print job type appears in the historical print job database. For example, a frequency value may represent a percentage of historical print jobs in a historical print job database having a certain print job type. In an embodiment, a frequency value may be within a range representative of a frequency with which a print job type appears in a historical print job database. For example, each print job type in a historical print job database may have an associated range of values between zero and one. The range may correspond to the frequency of the print job type in the historical print job database. Table 3 illustrates exemplary frequencies associated with the historical print jobs illustrated in Table 2 according to an embodiment.

TABLE 3

| Print Job Type | Frequency |
|---|---|
| Book | 0-0.50 |
| Envelope | 0.51-0.80 |
| Magazine | 0.81-0.90 |
| Manuscript | 0.91-1.00 |

As illustrated by Table 3, each print job type in a historical print job database may have an associated interval. For example, of the ten historical print jobs in the historical print job database illustrated in Table 2, five historical print jobs are associated with a print job type of "Book" (i.e., Historical Print Jobs 1-4). As such, 50% of the historical print jobs have a print job type of "Book." If a range of frequency values is from zero to one, then a "Book" print job type may account for a portion of this range equal to the proportion of historical print jobs in the historical print job database associated with the "Book" print job type. For example, as illustrated in Table 3, a "Book" print job type may be associated with an interval of 0.00-0.50 in the frequency value range. Additional and/or alternate values may be used within the scope of this disclosure.

Similarly, an "Envelope" print job type is associated with 30% of the historical print jobs in the historical print job database illustrated in Table 2. As such, an "Envelope" print job type may be associated with values representing 30% of the frequency value range. For example, as shown in Table 3, an "Envelope" print job type may be associated with an interval of 0.51-0.80 in the frequency range.

In an embodiment, each synthetic print job may be assigned a value that is within the frequency range. In an embodiment, a synthetic print job may be randomly or pseudo-randomly assigned a value that is within a frequency range. For instance, a random number generator may be used to assign a synthetic print job a value that within a frequency range. For example, each synthetic print job may be randomly assigned a value between a frequency range of zero and one. In an embodiment, the randomly assigned value may determine the print job type associated with the synthetic print job. In an embodiment, a synthetic print job associated with a randomly assigned value may be assigned a print job type that corresponds to the interval into which the randomly assigned value falls. For example, a synthetic print job may be randomly assigned a value of 0.33. Referring to Table 3 above, 0.33 is within the interval associated with a "Book" print job type (i.e., 0-0.50), so the synthetic print job may be assigned a print job type of "Book."

In an embodiment, print job content information associated with one or more synthetic print jobs may be determined 230. In an embodiment, certain types of print job content information may be associated with a print type. For example, a print job of print type "Book" may be associated with print job content information that is different than a print job of print type "Magazine."

In an embodiment, one or more parameter values associated with the determined print job type of a synthetic print job may be determined. For instance, in the example above, the synthetic print job was assigned a "Book" print job type. In an embodiment, a "Book" print job type may be associated with the following parameters: Duration, Print Job Quantity, Printing Quantity, Folding Quantity and Binding Quantity. Values for each of these parameters may be determined based on one or more parameter values in a historical print job database.

In an embodiment, a set of job content parameter values associated with each historical print job in a historical print job database may have a corresponding frequency value. In an embodiment, a set of job content parameter values may include one or more job content parameter values. A frequency value may represent a measurement of how often the set of job content parameter values appear in the historical print job database among print jobs having the same print job type. For example, a "Book" print job type may have a "Printing Quantity" parameter indicating the number of pages that are printed and a "Duration" parameter indicating the amount of time required to process the print job. A historical print job in the historical print job database having a "Book" print type may have a "Printing Quantity" parameter value of 1,000—meaning that 1,000 pages of that print job are printed, and a "Duration" parameter of 2 hours. The set of parameter values "Printing Quantity" and "Duration" may be associated with a frequency value indicating how often historical print jobs in the historical print job database having a "Book" print job type have a "Printing Quantity" parameter value of 1,000 and a "Duration" parameter of 2 hours.

In an embodiment, a frequency value may be a range representative of a frequency with which a set of job content parameter values appears in a historical print job database amongst print jobs of a certain print job type. For example, each set of parameter values may have an associated range of values between zero and one. The range may correspond to the frequency with which the set of parameter values appear in a historical print job database among print jobs of the same print job type.

For example, as discussed above, a "Book" print job type may have values associated with the parameters: Duration, Print Job Quantity, Printing Quantity, Folding Quantity and Binding Quantity. Table 4 illustrates exemplary parameter values associated with the print jobs having a "Book" print job type shown in Table 3. Table 5 illustrates exemplary frequencies associated with each set of parameter values illustrated in Table 4.

TABLE 4

| Print Job Type | Duration (hours) | Print Job Quantity | Printing Quantity (pages) | Folding Quantity (pages) | Binding Quantity (pages) |
|---|---|---|---|---|---|
| Book | 4 hours | 100 | 10,000 | 5,000 | 10,000 |
| Book | 2.5 hours | 50 | 15,000 | 7,500 | 15,000 |
| Book | 8 hours | 2,000 | 400,000 | 200,000 | 400,000 |
| Book | 5 hours | 400 | 200,000 | 100,000 | 200,000 |
| Book | 2 hours | 110 | 10,000 | 5,000 | 10,000 |

TABLE 5

| Frequency | Print Job Type | Duration (hours) | Print Job Quantity | Printing Quantity (pages) | Folding Quantity (pages) | Binding Quantity (pages) |
|---|---|---|---|---|---|---|
| 0-0.20 | Book | 4 | 100 | 10,000 | 5,000 | 10,000 |
| 0.21-0.40 | Book | 2.5 | 50 | 15,000 | 7,500 | 15,000 |
| 0.41-0.60 | Book | 8 | 2,000 | 400,000 | 200,000 | 400,000 |
| 0.61-0.80 | Book | 5 | 400 | 200,000 | 100,000 | 200,000 |
| 0.81-1.00 | Book | 2 | 110 | 10,000 | 5,000 | 10,000 |

As illustrated by Table 5, each set of parameter values for historical print jobs having a print job type of "Book" may have an associated interval. For example, of the five historical print jobs in the historical print job database of the Book print job type, one historical print job is associated with a duration of 4 hours, a print job quantity of 100 copies, a printing quantity of 10,000 pages, a folding quantity of 5,000 pages and a binding quantity of 10,000 pages. As such, 20% of the historical print jobs of the "Book" print job type have a duration of 4 hours, a print job quantity of 100 copies, a printing quantity of 10,000 pages, a folding quantity of 5,000 pages and a binding quantity of 10,000 pages. If a range of frequency values is from zero to one, then historical print jobs of the "Book" print job type having a duration of 4 hours, a print job quantity of 100 copies, a printing quantity of 10,000 pages, a folding quantity of 5,000 pages and a binding quantity of 10,000 pages may account for a portion of this range equal to the proportion of historical print jobs in the historical print job database of print job type "Book" associated with a duration of 4 hours, a print job quantity of 100 copies, a printing quantity of 10,000 pages, a folding quantity of 5,000 pages and a binding quantity of 10,000 pages. For example, as illustrated in Table 5, a historical print jobs of the "Book" print job type having a duration of 4 hours, a print job quantity of 100 copies, a printing quantity of 10,000 pages, a folding quantity of 5,000 pages and a binding quantity of 10,000 pages may be associated with an interval of 0.00-0.20 in the frequency value range. Additional and/or alternate values may be used within the scope of this disclosure.

In an embodiment, each synthetic print job may be randomly assigned a value for the set of job content parameters associated with its corresponding print job type. For example, a synthetic print job having a "Book" print job type may be randomly assigned a value for the set of parameters Duration, Print Job Quantity, Printing Quantity, Folding Quantity and Binding Quantity that are within the frequency range. For example, each synthetic print job of a "Book" print job type may be randomly assigned a value between a frequency range of zero and one for the set of job content parameters associated with the Book print job type. In an embodiment, the randomly assigned value may determine the value of the set of parameters.

For example, parameters of a synthetic print job of a "Book" print job type may be randomly assigned the values illustrated in Table 6. Table 6 also illustrates the values that may be assigned to the set of job content parameters based on the corresponding randomly assigned values.

TABLE 6

| Randomly Assigned Value | Values | | | | |
|---|---|---|---|---|---|
| | Duration | Print Job Quantity | Printing Quantity | Folding Quantity | Binding Quantity |
| 0.24 | 2.50 | 50 | 15,000 | 7,500 | 15,000 |
| 0.78 | 5 | 400 | 200,000 | 100,000 | 200,000 |
| 0.13 | 4 | 100 | 10,000 | 5,000 | 10,000 |

For example, the set of job content parameters Duration, Print Job Quantity, Printing Quantity, Folding Quantity and Binding Quantity may be randomly assigned the value of 0.24. This value may be matched to an interval to determine what corresponding values should be assigned to the synthetic print job. 0.24 falls within the interval 0.21-0.40 associated with values of Duration=2.5 hours, Print Job Quantity=50, Printing Quantity=15,000, Folding Quantity=7,500 and Binding Quantity=15,000, which are assigned to the synthetic print job.

Generating synthetic print job information, and the ability to modify this information to account for market conditions may offer more accurate predictions of future operational costs and the ability to provide meaningful multi-tiered contract pricing based on future market conditions. For example, synthetic print demand information may be generated and modified to account for a certain percentage increase per year. This demand information may be used to determine what additional resources may be needed to operate a print shop. The cost of adding these resources to a print shop may be passed along to one or more customers. In an embodiment, sales personnel may be able to offer customers a variety of printing service prices dependent on future demand. Such a multi-tiered pricing policy may protect against abrupt increased operational costs caused by demand spikes, and may also optimize supply chain profit through enhanced supply chain coordination.

In an embodiment, synthetic print job information may be used to test 235 the robustness of a print shop. A robustness test may identify scenarios in which the operational efficiency of a print shop may be compromised. For example, scenarios such as changes in job arrival frequency, job type mix, job content and/or the like may affect the operational efficiency of a print shop. In an embodiment, a robustness test may be performed to determine whether or not to accept a new customer account. For example, an account manager may generate a set of demand data that accounts for jobs from one or more prospective customers. The demand data may be used to simulate print shop operations. One or more performance metrics associated with the simulated print shop operation may be analyzed 240 to determine whether the print shop is able to withstand the additional demand associated with the prospective customer account without encountering a significant decline in overall efficiency.

By way of example, two potential customer accounts, Account A and Account B, may be evaluated. The accounts may have identical demand patterns, except that all print jobs from Account A may be Type 1 print jobs, while all jobs from Account B may be Type 2 print jobs. A print shop may receive an average of 49 print jobs per day. Each account may be expected to bring in an additional 10 print jobs per day, or an increase of about 20% of the daily demand. An account manager may want to compare the accounts in terms of their potential impact on print shop operations.

Three sets of synthetic print job information may be generated, one for the following three scenarios: maintaining current accounts, adding Account A, and adding Account B. Each set of information may be processed to simulate print shop operations associated with the respective scenario. Table 7 illustrates exemplary performance metrics associated with processing pursuant to each scenario according to an embodiment.

TABLE 7

|  | Work Span (Operating Hours) | Average Turnaround Time (Operating Hours) | Average Station Utilization (Operating Hours) |
| --- | --- | --- | --- |
| Current Demand | 147 | 0.54 | 5.04 |
| Adding Account A | 110 | 0.82 | 7.70 |
| Adding Account B | 124 | 0.78 | 5.84 |

As illustrated by Table 7, when an account is added, the demand increases and both the average turnaround time and the average station utilization increase because of the additional strain on print shop operations. In an embodiment, the work span, which may be the number of operating hours needed to complete a fixed number of print jobs, decreases when an account is added. This may be due to the increased frequency in print job arrivals.

As shown by Table 7, when Account A is added, the average turnaround time increases 52% from 0.54 to 0.82, and the average station utilization increases 53% from 5.04 to 7.70. When Account B is added, the average turnaround time increases 44%, and the average station utilization increases 16%. As such, adding Account B would place less of a strain on the print shop, which shows that the current print shop design is less robust to Type 1 print jobs than to Type 2 print jobs. As shown by Table 7, adding Account B may be a more profitable choice than adding Account A. As such, if an account manager provides quotes to the customers associated with both accounts, he may set the contract price for Account A higher than the contract price for Account B to compensate for the higher operational stress that adding Account A would inflict on the print shop.

Figure 3:
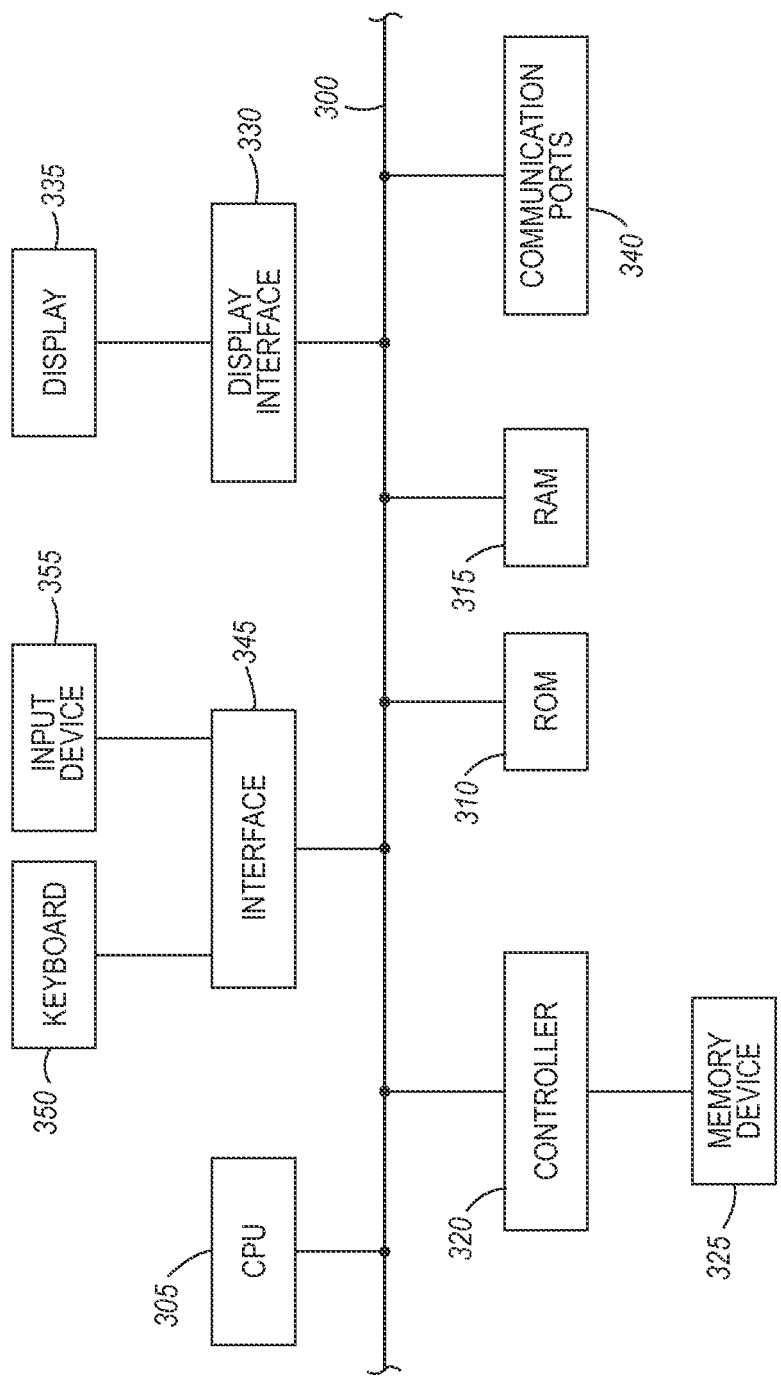
FIG. 3 illustrates a block diagram of exemplary internal hardware that may be used to contain or implement program instructions according to an embodiment.

FIG. 3 depicts a block diagram of exemplary internal hardware that may be used to contain or implement program instructions according to an embodiment. A bus 300 serves as the main information highway interconnecting the other illustrated components of the hardware. CPU 305 is the central processing unit of the system, performing calculations and logic operations required to execute a program. Read only memory (ROM) 310 and random access memory (RAM) 315 constitute exemplary memory devices.

A controller 320 interfaces with one or more optional memory devices 325 to the system bus 300. These memory devices 325 may include, for example, an external or internal DVD drive, a CD ROM drive, a hard drive, flash memory, a USB drive or the like. As indicated previously, these various drives and controllers are optional devices.

Program instructions may be stored in the ROM 310 and/or the RAM 315. Optionally, program instructions may be stored on a tangible computer readable storage medium such as a hard disk, compact disk, a digital disk, flash memory, a memory card, a USB drive, an optical disc storage medium, such as Blu-ray™ disc, and/or other recording medium.

An optional display interface 330 may permit information from the bus 300 to be displayed on the display 335 in audio, visual, graphic or alphanumeric format. Communication with external devices may occur using various communication ports 340. An exemplary communication port 340 may be attached to a communications network, such as the Internet or an intranet.

The hardware may also include an interface 345 which allows for receipt of data from input devices such as a keyboard 350 or other input device 355 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of determining one or more performance metrics associated with a print shop, the method comprising:
   identifying one or more historical print jobs from a historical print job database, wherein each historical print job comprises a historical print job type and historical job content information;
   generating, by a computing device, one or more synthetic print jobs based on the historical job type and historical job content information associated with the identified historical print jobs, wherein one or more of the generated synthetic print jobs have an arrival time distribution at an arrival time comprising a Poisson process having a mean value that is based on a cumulative number of operating hour time units at the arrival time; and
   determining, by the computing device, one or more performance metrics associated with processing the one or more synthetic print jobs by a print shop.

2. The method of claim 1, wherein generating one or more synthetic print jobs comprises determining a synthetic print job type associated with a synthetic print job by:
   assigning a value to a synthetic print job, wherein the assigned value is selected from a range of values, wherein each historical print job type associated with the identified historical print jobs is associated with an interval representing a unique portion of the range of values, wherein a size of the interval is based on a frequency with which the corresponding historical print job type is present in the identified historical print jobs; and
   assigning the historical print job type associated with the interval that includes the assigned value within the corresponding unique portion of the range of values to the synthetic print job.

3. The method of claim 2, wherein assigning a value to a synthetic print job comprises one or more of the following:

randomly selecting the assigned value from the range of values; and pseudo-randomly selecting the assigned value from the range of values.

4. The method of claim 1, wherein generating one or more synthetic print jobs comprises determining print job content associated with a synthetic print job by:
identifying a synthetic print job type associated with the synthetic print job;
identifying a set of parameters associated with the identified synthetic print job type;
selecting a frequency value associated with the set of parameters, wherein the selected frequency value is selected from a range of values,
comparing the selected frequency value to an interval associated with the set of parameters of one or more of the identified historical print jobs, wherein the interval comprises values representing a unique portion of the range of values; and
in response to the selected frequency value being within the interval, for each parameter in the set of parameters, assigning the parameter a value equal to a value of the parameter associated with the interval.

5. The method of claim 4, further comprising repeating the comparing until the parameter is assigned a value.

6. The method of claim 1, further comprising modifying the one or more historical print jobs in the historical print job database to reflect one or more market conditions.

7. The method of claim 1, wherein determining one or more performance metrics comprises:
performing a robustness test of the print shop to determine one or more performance metrics associated with processing the generated synthetic print jobs by the print shop; and
generating a price quote for a new customer account based on at least one of the one or more performance metrics, wherein the generated synthetic print jobs represent a print demand associated with the new customer account.

8. The method of claim 1, wherein determining one or more performance metrics comprises:
performing a robustness test of the print shop to determine one or more performance metrics associated with processing the generated synthetic print jobs by the print shop;
determining whether to accept a new customer account based on at least one of the one or more performance metrics, wherein the generated synthetic print jobs represent a print demand associated with the new customer account.

9. A method of determining one or more performance metrics associated with a print shop, the method comprising:
identifying one or more historical print jobs from a historical print job database, wherein each historical print job comprises a historical print job type and historical job content information;
creating a modified set of historical print jobs by modifying at least one of the one or more historical print jobs in the historical print job database to reflect one or more of the following:
a market condition; and
a change in a parameter associated with one or more of the historical print jobs;
generating, by a computing device, one or more synthetic print jobs based on the modified set of historical print jobs, wherein one or more of the generated synthetic print jobs have an arrival time distribution at an arrival time comprising a Poisson process having a mean value that is based on a cumulative number of operating hour time units at the arrival time; and
performing a robustness test of a print shop to determine one or more performance metrics associated with processing the generated synthetic print jobs by the print shop.

10. The method of claim 9, wherein generating one or more synthetic print jobs comprises determining a synthetic print job type associated with a synthetic print job by:
assigning a value to a synthetic print job, wherein the assigned value is selected from a range of values, wherein each historical print job type associated with the identified historical print jobs is associated with an interval representing a unique portion of the range of values, wherein a size of the interval is based on a frequency with which the corresponding historical print job type is present in the identified historical print jobs; and
assigning the historical print job type associated with the interval that includes the assigned value within the corresponding unique portion of the range of values to the synthetic print job.

11. The method of claim 9, wherein generating one or more synthetic print jobs comprises determining print job content associated with a synthetic print job by:
identifying a synthetic print job type associated with the synthetic print job;
identifying a set of parameters associated with the identified synthetic print job type;
selecting a frequency value associated with the set of parameters, wherein the selected frequency value is selected from a range of values,
comparing the selected frequency value to an interval associated with the set of parameters of one or more of the identified historical print jobs, wherein the interval comprises values representing a unique portion of the range of values; and
in response to the selected frequency value being within the interval, for each parameter in the set of parameters, assigning the parameter a value equal to a value of the parameter associated with the interval.

12. The method of claim 9, further comprising:
generating a price quote for a new customer account based on at least one of the one or more performance metrics, wherein the generated synthetic print jobs represent a print demand associated with the new customer account.

13. The method of claim 9, further comprising:
determining whether to accept a new customer account based on at least one of the one or more performance metrics, wherein the generated synthetic print jobs represent a print demand associated with the new customer account.

14. A system for determining one or more performance metrics associated with a print shop, the system comprising:
a computing device; and
a computer-readable storage medium in communication with the computing device, wherein the computer-readable storage medium comprises one or more programming instructions for:
identifying one or more historical print jobs from a historical print job database, wherein each historical print job comprises a historical print job type and historical job content information,
generating one or more synthetic print jobs based on the historical job type and historical job content information associated with the identified historical print jobs, wherein one or more of the generated synthetic print jobs have an arrival time distribution at an arrival time comprising a Poisson process having a mean value that is based on a cumulative number of operating hour time units at the arrival time, and determining, by the computing device, one or more performance metrics associated with processing the one or more synthetic print jobs by a print shop.

15. The system of claim 14, wherein the one or more programming instructions for generating one or more synthetic print jobs comprise one or more programming instructions for determining a synthetic print job type associated with a synthetic print job by:

assigning a value to a synthetic print job, wherein the assigned value is selected from a range of values, wherein each historical print job type associated with the identified historical print jobs is associated with an interval representing a unique portion of the range of values, wherein a size of the interval is based on a frequency with which the corresponding historical print job type is present in the identified historical print jobs; and assigning the historical print job type associated with the interval that includes the assigned value within the corresponding unique portion of the range of values to the synthetic print job.

16. The system of claim 14, wherein the one or more programming instructions for generating one or more synthetic print jobs comprise one or more programming instructions for determining print job content associated with a synthetic print job by:

identifying a synthetic print job type associated with the synthetic print job;

identifying a set of parameters associated with the identified synthetic print job type;

selecting a frequency value associated with the set of parameters, wherein the selected frequency value is selected from a range of values, comparing the selected frequency value to an interval associated with the set of parameters of one or more of the identified historical print jobs, wherein the interval comprises values representing a unique portion of the range of values; and in response to the selected frequency value being within the interval, for each parameter in the set of parameters, assigning the parameter a value equal to a value of the parameter associated with the interval.

17. The system of claim 14, wherein the computer-readable storage medium comprises one or more programming instructions for modifying the one or more historical print jobs in the historical print job database to reflect one or more market conditions.

18. The system of claim 14, wherein the one or more programming instructions for determining one or more performance metrics comprise one or more programming instructions for:

performing a robustness test of the print shop to determine one or more performance metrics associated with processing the generated synthetic print jobs by the print shop; and generating a price quote for a new customer account based on at least one of the one or more performance metrics, wherein the generated synthetic print jobs represent a print demand associated with the new customer account.

19. The system of claim 14, wherein the one or more programming instructions for determining one or more performance metrics comprise one or more programming instructions for:

performing a robustness test of the print shop to determine one or more performance metrics associated with processing the generated synthetic print jobs by the print shop;

determining whether to accept a new customer account based on at least one of the one or more performance metrics, wherein the generated synthetic print jobs represent a print demand associated with the new customer account.

* * * * *